SYNCHRONOUS MEMORY SYSTEM

Filed July 20, 1965

INVENTORS
Volker Hildebrand &
Hansjörg Neumeister
BY Spencer & Kaye
ATTORNEYS

United States Patent Office 3,414,883

Patented Dec. 3, 1968

3,414,883
SYNCHRONOUS MEMORY SYSTEM

Volker Hildebrand, Constance, Germany, and Hansjörg Neumeister, Tokyo, Japan, assignors to Telefunken, Patentverwertungsgesellschaft m.b.H., Ulm (Danube), Germany Filed July 20, 1965, Ser. No. 473,319
Claims priority, application Germany, July 20, 1964, T 26,634
17 Claims. (Cl. 340—172.5)

ABSTRACT OF THE DISCLOSURE

A synchronous memory system including a pulse delay line, a write-in generator for applying pulses to one end of the pulse delay line, and two feedback circuits coupled to the other end of the pulse delay line so as to receive pulses at different times. A computer is connected in series with one of the feedback circuits, and switch means is provided for selectively connecting the input of the write-in generator to the output of the computer or to the other feedback circuit. The delay time between the application of pulses to the two feedback circuits is equal to the data processing time of the computer.

The present invention relates generally to data storage systems and more particularly to a system including a dynamic storage line having a pair of outputs from which are derived data and synchronizing signals.

It is known to use, in connection with data processing devices, fed-back delay lines as circulating, dynamic storage units for information bits. Such storage units can store a considerable number of circulating bits therein; the bits can be removed from storage or interrogated in serial form. The present invention concerns essentially, without, however, being limited thereto, a magnetostriction line which functions as a circulation storage unit. The magnetostriction line can store a sufficient number of bits to accommodate all data which are to be processed or have been processed in the registers of a small computer, for example, a table-model type.

It is an object of the present invention to provide a new and improved data processing system with a recirculating, dynamic storage system.

Another object of the invention is to provide a new and improved data processing system wherein synchronizing pulses are derived in response to data derived from a recirculating memory, whereby the need for an external synchronizing source is obviated.

A further object of the invention is to provide a system with a dynamic delay line circulating storage unit, for example, a magnetostriction line, and a data processing device, particularly a computer, which system is not complex in construction and relatively maintainence free in operation; in particular, it is desired to obviate the dependency of the transit time paths upon temperature as has heretofore been present in known systems.

According to the invention, two feedback circuits are provided for a write-in generator of the delay line. The second feedback circuits receives information bits deriving from the line with a delay compared to the first feedback circuit. An information processing device is inserted in the first feedback circuit and generates processed bits with a delay with respect to the input bits thereof. The delay introduced by the data processor equals the delay time between the inputs of the two feedback circuits. Further, the write-in generator is selectively connectable, via a switch, to one or the other of the two feedback circuits.

The invention provides furthermore that the write-in generator is capable of writing in bits which are individually discriminatable, for the purpose of obtaining clock or synchronizing pulses. Data is supplied by the generator to the input of the line at times controlled in response to the application of data to both feedback circuits, in such a manner that an individual bit several times produces a clock or synchronizing pulse located in the desired synchronizing frame.

According to a further development of the invention, there is provided the additional feature wherein the delay time between the two feedback circuits is co-prime with the delay time of the entire delay line, measured in units of the output time difference of successive bits, and, the write-in generator derives information bits with a synchronized delay. The term "co-prime," as used herein with reference to the delay time of the two feedback circuits and the delay lines, means that the two delay times have no common integral divisor in terms of bit times except the number 1. In addition, the write-in generator, when fed write-in pulses, writes information bits into the delay line independently of the data processing device. To initiate operation of the write-in generator independently, a switch is provided for producing a first synchronizing or clock pulse. Thereby, the circulating storage unit is enabled to operate self synchronously and can easily be placed into this condition. Provision is also made for applying feedback synchronizing pulses to the data processing device to control timing within the device.

In a preferred embodiment, the first feedback circuit is connected to an intermediate tap of the delay line and the second feedback circuit is connected to a tap at the end of the line; the write-in generator is constructed as a synchronized delay flip-flop, or a synchronized shift register chain.

Additional objects and advantages of the present invention will become apparent upon consideration of the following description when taken in conjunction with the accompanying drawings in which.

Figure 1:
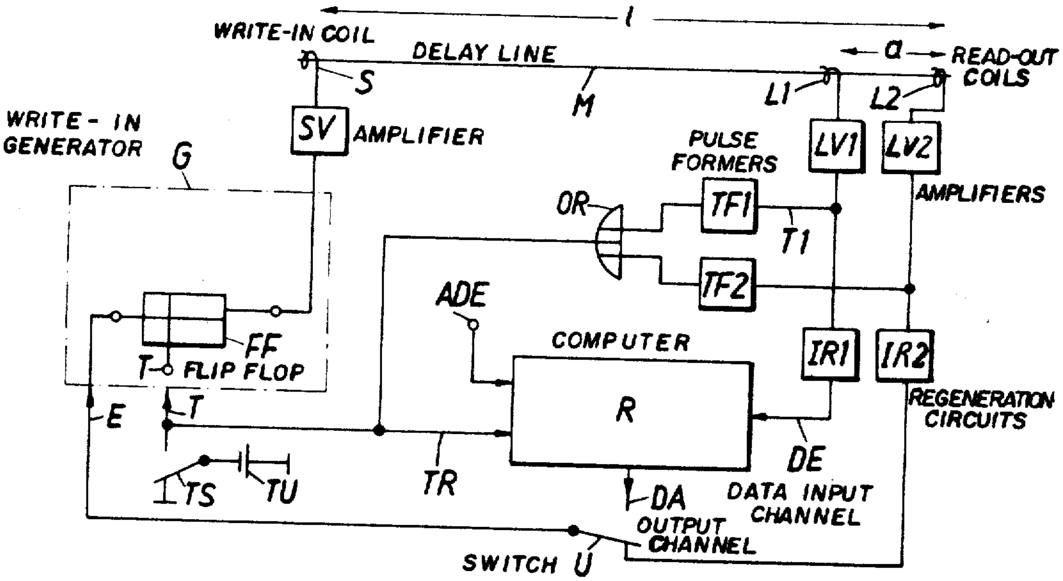
FIGURE 1 is a block diagram of an embodiment of a system according to the invention.

With more particular reference to the drawings, FIGURE 1 shows magnetostriction delay line M which is drawn as a straight line but which is usually in the shape of a spiral. Write-in coil S is positioned at the input end of line M while read out coil $L_2$ at the output end of the line is located a distance $l$ along the line from coil S. A further read out coil $L_1$ is positioned along line M at a spacing $a$ in front of final read out coil $L_2$. Currents are applied to write-in coil or head S with writing amplifier SV that is responsive to write-in generator G. Current is applied to coil S in such a manner that individually discriminatable bits of binary zero and one values are fed to line M. For example, in a bipolar RTZ (return to zero) code, a "positive" input pulse results in torsion of line M in a clockwise direction of rotation, to represent the binary one value, while a "negative" pulse causes line M to be twisted in the counter clockwise direction to represent the binary zero value. Other modes of binary representation in line M are possible, such as: phase positioning of the pulses; or the "undulating script" approach that is known in the magnetic recording art. All of these techniques enable the derivation of finite signals from read out at coils $L_1$ and $L_2$ for both binary values; the representation of one binary value by the absence of a pulse in line M is not adequate because no internal clock or synchronizing source is provided.

Read out coils $L_1$ and $L_2$ are connected via read out amplifiers $LV_1$ and $LV_2$ to information regenerating circuits $IR_1$ and $IR_2$ respectively. Information regeneration circuits $IR_1$ and $IR_2$ sense the mode of the signals generated by coils $L_1$ and $L_2$ as amplified by amplifiers $LV_1$ and $LV_2$, respectively, and derive appropriately valued binary signals. In one specific embodiment each of regeneration circuits $IR_1$ and $IR_2$ comprises a threshold network that generates a binary one output when the input thereof exceeds a predetermined amplitude and at all other times derives a binary zero output. As is seen infra, the outputs of information generation networks $IR_1$ and $IR_2$ are examined only when a synchronizing pulse is generated so that the quiescent zero state of their outputs is not subject to misinterpretation.

The binary signal generated by circuit $IR_1$ is fed to the data input channel DE of a typical table-model general or special purpose digital computer R. In contrast, the output of circuit $IR_2$ is selectively coupled through switch U to input E of write-in generator G. In the other position of switch U, data output channel DA of computer R is connected with input E.

Read out head $L_1$, amplifier $LV_1$, regenerator $IR_1$, and computer R form a first feedback circuit which receives information from delay line M earlier, by a period of time determined by the spacing *a*, than the second feedback circuit formed by read out head $L_2$, amplifier $LV_2$ and regenerator $IR_2$. This time period is selected to be as long as the processing time of computer R; specifically, the time interval is the period from the entrance of a bit, *j*, at input DE until the exit of a processed bit resulting from the bit *j* at output DA. This period is maintained constant for all of the different operations performed by computer R in any known manner, for example by delaying the output depending upon the operation by means of a counter or shift register responsive to the computer synchronizing pulse input. The individually occurring, actual computing times within the computer will in many instances, of course, be shorter than the propagation time in line M for the spacing *a*.

If it is desired to insert data which are read from the delay line storage unit M via reading coil $L_1$ and processed in computer R, into the cyclic information circulation, in place of unprocessed information, throw-over switch U is actuated to the position opposite from that illustrated at the moment at which the original, unprocessed information reaches the reading coil $L_2$ and thus exits into the void. Thereby, output channel DA of computer R is connected via input E of the write in generator G to write-in head S. By means of the above-described measures, the processed bits deriving from computer R are fed into the circulation cycle beginning at write-in generator G, at the same instants as if they would have passed along the second feedback circuit comprising read out head $L_2$, amplifier $LV_2$, regenerator $IR_2$, switch U, and input E, in an unprocessed condition. The latter path is effective when switch U is in the illustrated position at which time it is not required that processed binary bits deriving from computer R be stored.

As mentioned above, information bits propagate through the dynamic storage medium comprising delay line M in a form which permits the derivation of synchronizing or timing pulses from the waves derived from heads $L_1$ or $L_2$. This arrangement is utilized to make bit circulation in circulating storage unit M self-synchronizing. It is noted that the synchronizing pulse formed by the circulation storage unit is also fed to computer R for timing or synchronizing control thereof. Thereby, there is no necessity with the system of the present invention to provide a separate or independent pulse generator for write-in generator G and/or for computer R as a synchronizing clock source. Furthermore, there is no possibility that the derivation of read-out pulses from line M will be out of synchronism with the autonomic application of write-in pulses to line M or derivation of data pulses from data processor R because of temperature changes of line M. Previously, solutions to the problem of maintaining synchronization between dynamic delay lines and computers had been attempted by providing thermostats for maintaining the temperature of delay line M constant.

Before the beginning of data processing delay line M is to be filled completely with bits so that bits are enabled to circulate therein in a self-synchronized manner. Thereafter, computer R has read into it data words via lead ADE and subsequently derives data words on lead DA. The data words are of a predetermined length corresponding, for example, to the capacity of the registers in computer R. The computer is responsive to a portion of the circulating bit pattern wherein *x* of such portions represent, respectively, *y* sequential bits and the delay line is densely filled with $x \cdot y \cdot$ bits. The subsequently described apparatus serves this purpose.

Figure 3:
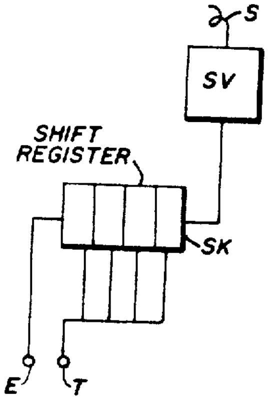
FIGURE 3 is a block diagram of an alternate write-in generator for the embodiment illustrated in FIGURE 1.

Write-in generator G, symbolized by the dot-dash lines, is responsive to write-in clock pulses via line T. From generator G, there are derived information bits that are fed to write-in coil S with a synchronized delay produced by the generator itself. In the illustrated embodiment, write-in generator G consists of a synchronized delay flip-flop FF, which flip-flop FF delivers in a known manner a binary zero or one when a timing pulse is applied thereto via terminal T. The value of the binary output generated by flip-flop FF depends upon the binary signal coupled thereto on lead E immediately prior to the pulse on lead T. In other embodiments, write-in generator G can comprise a synchronized shift register chain SK with *p* positions, such as shown in FIG. 3, so that a bit coupled thereto via input E is derived from the last stage of the shift register chain after *p* timing pulses have been applied to terminal T.

From the first feedback circuit, a clock line $T_1$ is branched off from the output of amplifier $LV_1$. Line $T_1$ is connected via pulse former $TF_1$ with one input of OR-gate OR; the second input of the OR-gate is connected via pulse modulator $TF_2$ and line $T_2$ to the second feedback path, at the output of read out amplifier $LV_2$. Pulse shapers $TF_1$ and $TF_2$ are constructed to generate unipolarity synchronizing or timing pulses in response to a binary zero or one being coupled thereto. In consequence, the OR-gate derives a synchronizing pulse, whenever a binary zero or one is detected by read out heads $L_1$ or $L_2$. The output of OR-gate OR is fed in parallel to clock input T of write-in generator G, and to the clock input TR of computer R.

To initiate operation of write-in generator G and preload a clock pulse therein, clock pulse lead T thereof is coupled to voltage source TU via switch TS.

Figure 2:
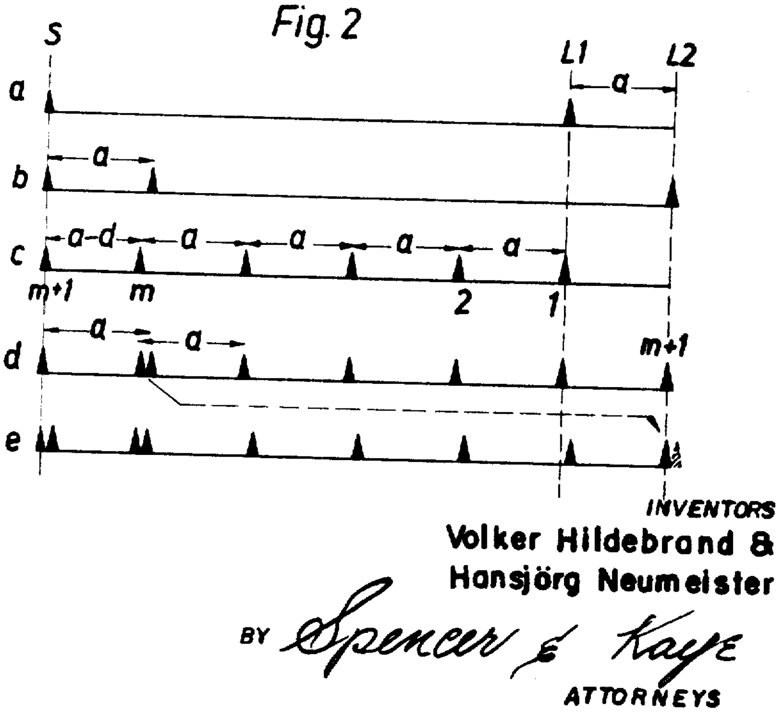
FIGURE 2 illustrates, in lines *a* through *e* thereof, a number of pulse diagrams pertaining to the system of FIGURE 1.

When the initially empty circulation storage unit is prepared for operation, a single clock pulse is applied via switch TS to input T. Wirte-in generator G thereby writes the binary zero or one value stored therein, or in the last shift register stage, into write-in head S at the beginning of dynamic delay line M (cf. line *a* of FIG. 2). Upon reaching first read out coil $L_1$ (line *a* of FIG. 2), this binary value produces, via the first clock-feedback channel $T_1$, a clock or synchronizing pulse. The clock pulse derived from the OR-gate steps write-in generator G so that a further data bit is applied to input S of delay line M.

In response to the first pulse reaching read out coil $L_2$, a further clock pulse is applied to input T via the second clock-feedback channel $T_2$. In consequence, a new data bit is written into line M and is separated from the previously read in data bit by the distance *a* (line *b* of FIG. 2). When the first of the two bits separated by the distance *a* reaches coil $L_1$, it produces a clock pulse for input T. When the first bit reaches coil $L_2$, the second bit passes simultaneously across coil $L_1$. Because of the time coincidence in the derivation of pulses by channels $T_1$ and $T_2$, only one clock pulse is applied to input T by the OR-gate. When the second bit reaches coil $L_2$, a third clock pulse arrives at input T, so that the above-mentioned two bits (shown in FIGURE 2*b* as separated by *a*) have now produced three new ones. Because of the continuing multiplication of binary bits in line M, the succession of bits having a mutual spacing *a* is extended. The spacing *a* is selected to be such that it has no common divisor, except 1 (one) with the entire length $l=n \cdot a-p \cdot d$ of delay line M, measured in units *d* of the smallest desired bit distance corresponding to a chronological distance *t* of the bits, i.e., the time it takes for a pulse to propagate from head S to head $L_2$ is co-prime with the time required for a pulse to propagate from head $L_1$ to head $L_2$. Thereby, when the first bit of the bit group 1, 2 . . . *m* separated by the bit distance *a*, reaches reading coil $L_1$, according to line *c* of FIG. 2, the bit $m+l$ which appears in synchronized form, is not separated from bit *m* by the distance *a*. Instead, the *m* and $(m+l)$ bits are spaced by the distance $a-p \cdot d$ (*p* being an integral number). As an example, assume $p=1$, whereby a spacing of $a-d$ is attained as shown in line *c* of FIG. 2. Thereafter, there is built up a further succession of bits having the spacing *a* between the first succession of bits (lines *d* and *e* of FIG. 2). The process of blending in further bit successions is continued with a progressively increasing multiplication rate of the bits, until the entire line M is filled with bits having the spacing *d*, to produce an uninterrupted clock pulse synchronization for the line and computer R.

The computer R has a data input channel ADE for the introduction of, for example, keyed data from an external source. If data from the external source or calculated data deriving from computer R, are to be stored and read into the computer again at a later time, by connecting the computer R into the first feedback circuit by means of the throw-over switch U, then the co-prime relation between 1 and *a* is changed so that the already mentioned successively following bit pattern sections or storage "locations" which are intended for the storage of, respectively, one word, will remain in the same place within each storage cycle. In this condition, the entire transit time of an information bit through line M must be an integral multiple of the delay time between the read out coils $L_1$ and $L_2$. The integral relationship between the times associated with *l* and *a* is accomplished by the time a data bit is delayed when propagated from lead E to head S by *p* synchronizing pulses. The delay is determinable by choosing the number of stages in write-in generator G when a shift register is used and by the delay time of the flip-flop when a delay flip-flop is used. Hence, the total length of the delay line is considered from input E to read out head $L_2$ and is a multiple of the transit time between $L_1$ and $L_2$.

It will be understood that the above description of the present invention is susceptible to various modifications, changes, and adaptations, and the same are intended to be comprehended within the meaning and range of equivalents of the appended claims.

What is claimed is:

1. A synchronous memory system for a data processing machine, comprising, in combination: a dynamic memory having a signal input and first and second signal outputs; means for delaying the signal deriving from the second output relative to the signal deriving from the first output by a time interval equal to the processing time of an information bit in the machine; means for coupling information bits deriving from said first output to the machine; and means for selectively coupling the information bits deriving from the machine and the information bits deriving from said second output to said input.

2. The system of claim 1 wherein the delay time between said outputs is a co-prime number with the delay time between the input and said second output.

3. The system of claim 1 further including means for deriving synchronizing pulses in response to the derivation of a signal by either of said outputs, and means responsive to said synchronizing pulses for controlling the application of individually discriminatable information bits to said input.

4. The system of claim 3 wherein the delay time between said outputs is a co-prime number with the delay time between the input and said second output.

5. The system of claim 4 further including switch means for preloading a synchronizing pulse into said means for controlling.

6. The system of claim 4 wherein said means for controlling comprises a shift register having its first stage responsive to the binary bits deriving from said machine or said second output means and being stepped by said synchronizing pulses.

7. The system of claim 4 wherein said means for controlling comprises a delay flip-flop set in response to the binary bits deriving from said machine or said second output means, said flip-flop being controlled to derive a binary output for said input in response to said synchronizing pulses.

8. The system of claim 3 further including means for coupling said synchronizing pulses to said machine for timing control thereof.

9. The system of claim 1 wherein said memory comprises delay line means, said second output means being positioned to be responsive to signals at the end of said delay line means, and said first output means being positioned to be responsive to signals at an intermediate point along said delay line means.

10. In combination, a data processing machine; a dynamic memory having a signal input and first and second signal, outputs; means for delaying the signal deriving from the second output relative to the signal deriving from the first output by a time interval equal to the processing time of an information bit in the machine; means for coupling information bits deriving from said first output to the machine; and means for selectively coupling the information bits deriving from the machine or the information bits deriving from said second output to said input.

11. A system for recirculating binary data bits, comprising, in combination: a dynamic memory having a signal input and first and second signal outputs; means for delaying the signal deriving from the second output relative to the signal deriving from the first output; means responsive to the signals detected by either of said outputs for deriving synchronizing pulses; and means responsive to said synchronizing pulses for controlling the time at which binary bits deriving from said second output are applied to said input.

12. The system of claim 11 wherein the delay time between said outputs is a co-prime number with the delay time between the input and said second output.

13. A synchronous memory system for a data processing machine, comprising, in combination: a dynamic memory having a signal input and first and second signal outputs; means for delaying the signal deriving from the second output relative to the signal deriving from the first output by a time interval equal to the processing time of an information bit in the machine; means for coupling information bits deriving from said first output to the machine; means responsive to the signals detected by either of said outputs for deriving synchronizing pulses; and means responsive to said synchronizing pulses for controlling the time at which binary bits deriving from said machine are applied to said input.

14. The system of claim 13 further including means for coupling said synchronizing pulses to said machine for timing control thereof.

15. A synchronous memory system having a transit path in which there is a circulating storage unit, comprising, in combination:

a write-in generator coupled to one end of the transit path;

two feedback circuits connected to the other end of the transit path with the second feedback circuit receiving the information bits with a delay as compared to the first feedback circuit;

a data processing device connected in the first feedback circuit and issuing at its output processed bits with a delay with respect to the input bits, such delay corresponding to the delay time between the two feedback circuits; and means for selectively connecting the write-in generator to one of the feedback circuits.

16. An arrangement as defined in claim 15 wherein the amount of the delay time between the two feedback circuits does not have a common divisor, except 1, with the amount of the delay time of the entire transit path, measured in units of the output time difference of successive bits, said write-in generator being operable to issue information bits with a synchronized delay time.

17. An arrangement as defined in claim 16 wherein the write-in generator is operable to write information bits into the transit path independently from the data processing device when being fed write-in pulses, and switch means for producing a first input pulse to said write-in generator.

References Cited

UNITED STATES PATENTS

| | | | |
|---|---|---|---|
| 2,832,064 | 4/1958 | Lubkin | 340—174.1 |
| 3,001,180 | 9/1961 | Williams | 340—174.1 |
| 3,107,344 | 10/1963 | Baker et al. | 340—173 |
| 3,225,183 | 12/1965 | Horrell | 340—172.5 |
| 3,278,904 | 10/1966 | Le Kven | 340—172.5 |

PAUL J. HENON, *Primary Examiner.*

J. VANDENBURG, *Assistant Examiner.*